(12) United States Patent
Carlon

(10) Patent No.: US 6,860,597 B2
(45) Date of Patent: Mar. 1, 2005

(54) RIMLESS EYEWEAR

(76) Inventor: Roberto Carlon, Castello, 2971, Venezia (IT), I-30122

( * ) Notice: Subject to any disclaimer, the term of this patent is extended or adjusted under 35 U.S.C. 154(b) by 0 days.

(21) Appl. No.: 10/363,135

(22) PCT Filed: Aug. 23, 2001

(86) PCT No.: PCT/IB01/01517

§ 371 (c)(1),
(2), (4) Date: Mar. 6, 2003

(87) PCT Pub. No.: WO02/21193

PCT Pub. Date: Mar. 14, 2002

(65) Prior Publication Data

US 2004/0051843 A1 Mar. 18, 2004

(51) Int. Cl.[7] ................................................ G02C 1/02
(52) U.S. Cl. ....................................... 351/110; 351/124
(58) Field of Search ................................ 351/110, 124, 351/41, 158

(56) References Cited

U.S. PATENT DOCUMENTS 5,073,020 A    12/1991   Lindberg et al.
5,684,559 A   * 11/1997   Lin ............................ 351/110
5,748,280 A    5/1998   Herman
6,007,200 A   * 12/1999   Tachibana ................... 351/110

FOREIGN PATENT DOCUMENTS

WO    WO 95/18985    7/1995
WO    WO 00/29896    5/2000

* cited by examiner

Primary Examiner—Hung Xuan Dang
(74) Attorney, Agent, or Firm—Young & Thompson

(57) ABSTRACT

Eyewear comprising a first and a second lens and a support frame for the lenses having a first and a second lateral arm and a bridge. The lateral arms and/or bridge are connected to the corresponding lenses by a respective portion for attachment made of metal wire, which has a first longitudinal insertion portion, inserting in a first through hole provided within the respective lens, and a second longitudinal portion, which is inserted in a second hole provided in the lens. The attachment portion further comprises a first transverse portion which extends bent from the first longitudinal portion downstream of the hole for the insertion thereof, and wherefrom the second longitudinal insertion portion extends bent in the through hole. The first longitudinal insertion portion is also integral with a transversely bent portion which bears against the lens on the side opposite to the first transverse portion, co-operating therewith to the secure retaining of the corresponding lens.

49 Claims, 10 Drawing Sheets

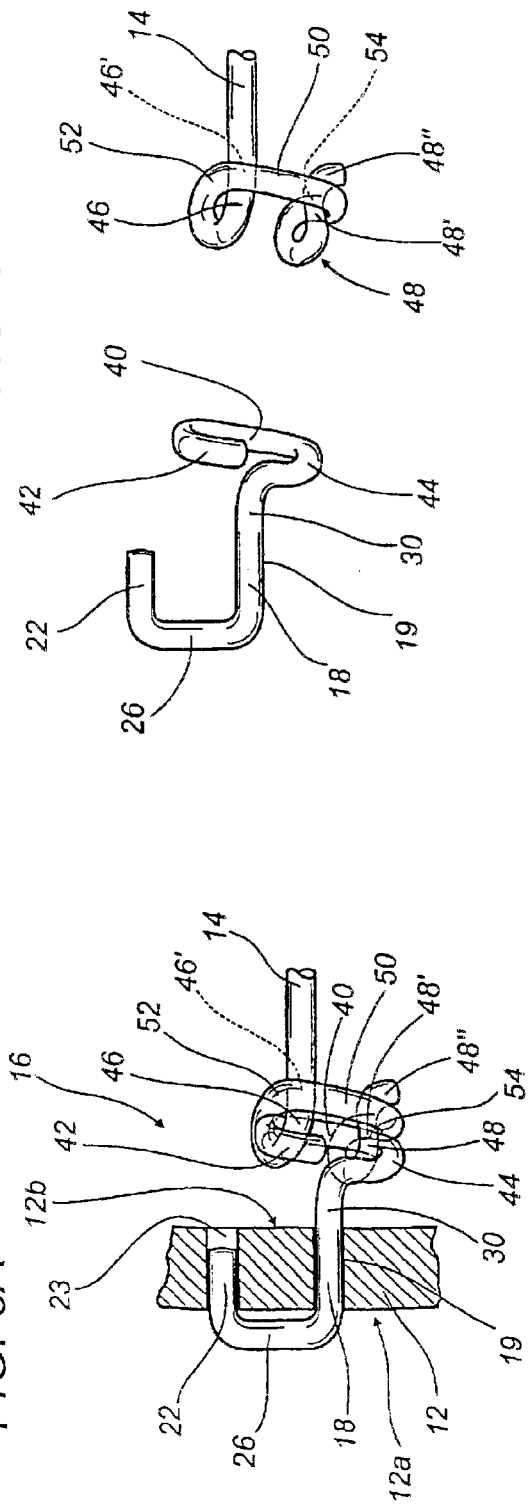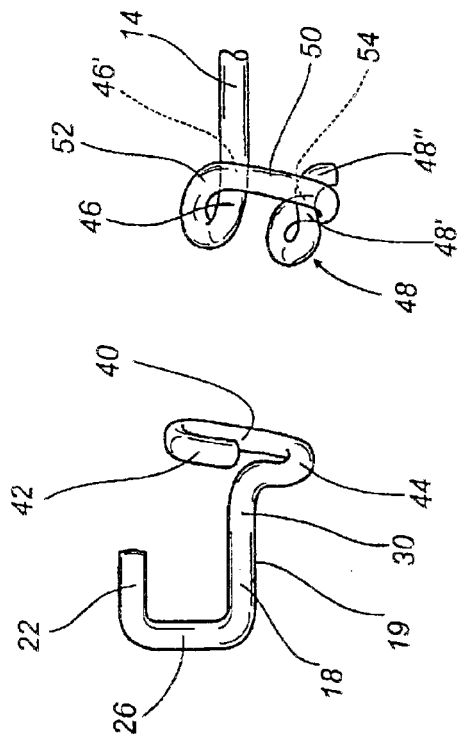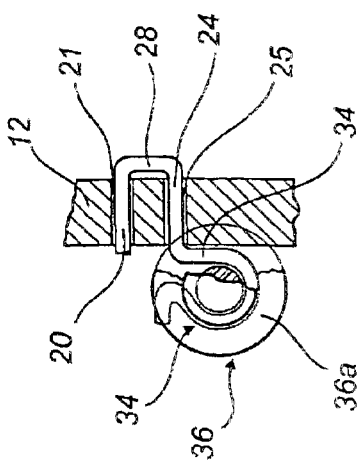

FIG. 4
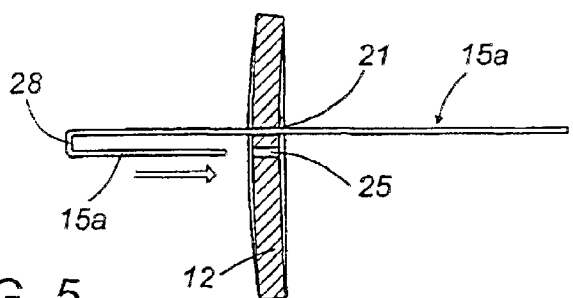
FIG. 5
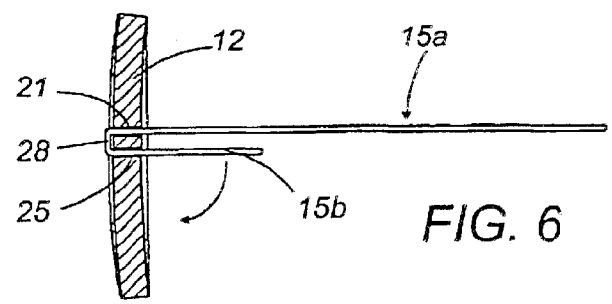
FIG. 6
FIG. 7
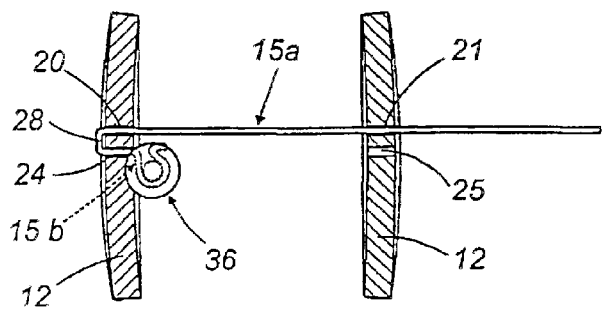
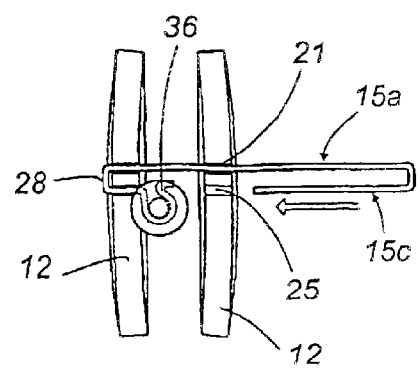
FIG. 8

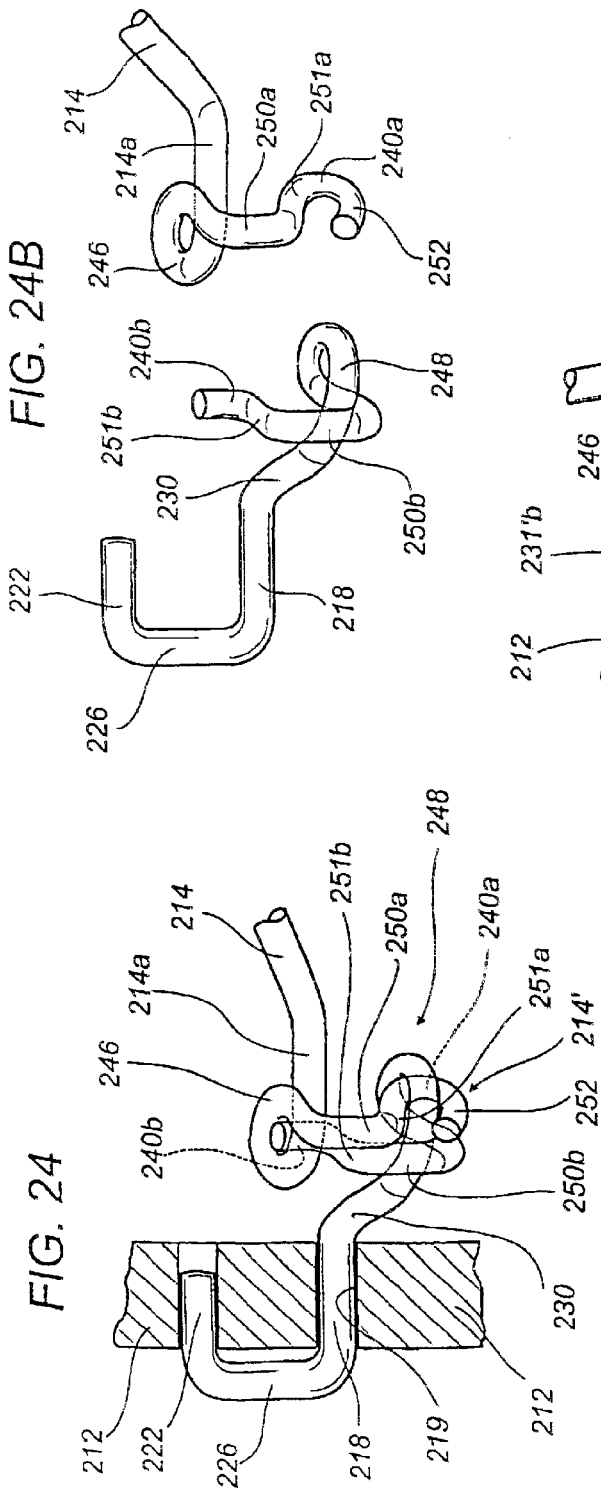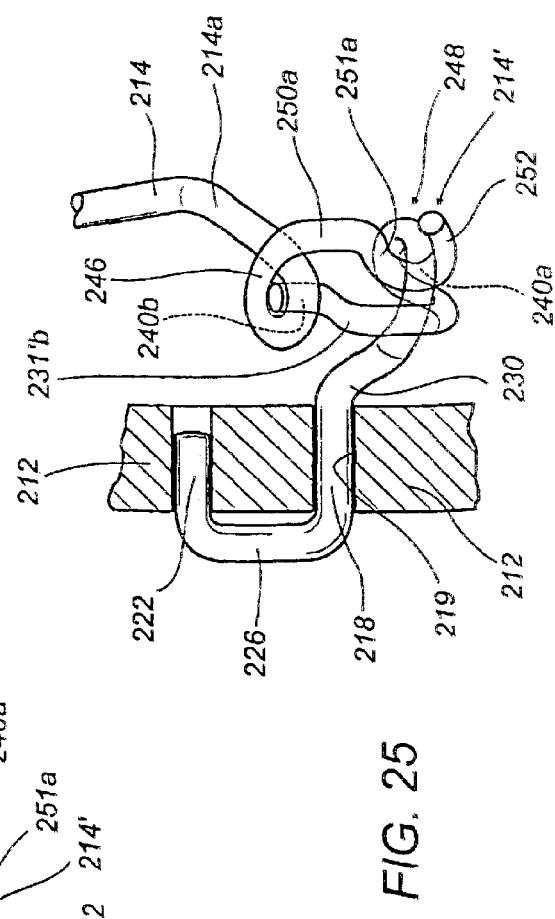

RIMLESS EYEWEAR

TECHNICAL FIELD

The present invention relates in particular to an eyewear of the kind known as "rimless". The present invention also concerns a fastening system which is particularly, but not exclusively, usable in said rimless eyewear.

BACKGROUND ART

From French Patent Application No. 2723649, an eyewear is known, of the type known as rimless, which exhibits a metal wire support structure, in which the lenses are connected to the lateral arms and to the intermediate connecting bridge element, between said lenses, by means of a respective attachment portion which has a first longitudinal pivot part that is inserted into a first through hole of the lens and a second longitudinal pivot part that is inserted in a second through hole provided in the respective lens. Said first and second pivot are inserted in the corresponding hole from the front part, which is oriented, in the use, towards the user's face.

In the eyewear described in said French Patent Application No. 2723649, from the side opposite to that of insertion of said pivots, corresponding caps are also inserted in said holes, which caps are held in the holes by means of glue and allow to retain the lens to the supporting frame.

Such an attachment system between the support frame and the lenses, however, is excessively complex and requires the use of glue and of an excessive number of components. Moreover in case the adhesion of said glue subsequently lacks the connection or fastening between the lenses and the supporting frame is completely disassembled.

DISCLOSURE OF INVENTION

According to an aspect of the present invention, an eyewear is provided comprising lens means and a frame for supporting said lens means, in which said support frame comprises a first and a second lateral arms and means for fastening the respective arm to said lens means, said fastening means comprising a first and a second longitudinal portions for introduction into corresponding hole means provided in said lens means, characterised in that a perpendicular connection portion is provided, which has respective ends for joining to said first and second longitudinal fastening portions, and in that said first and second longitudinal fastening portions are inserted into corresponding first and second holes in said lens means.

Further provided is an eyewear comprising a first and a second lens and a supporting frame for said first and second lens, in which said support frame comprises a bridge for intermediate fastening between said lenses, and means for fastening said bridge to the respective lens, said fastening means comprising a first and a second longitudinal portion for introduction into corresponding hole means provided in the corresponding lens; characterised in that said fastening means comprise a perpendicular connection portion, which has respective ends for joining to said first and second longitudinal fastening portions; and in that said first and second longitudinal fastening portions are inserted into corresponding first and second hole in the corresponding lens.

In practice, according to the present advantageous aspect, the provided configuration of the means for fastening the frame to the corresponding lens enables to obtain a connection that allows a perfect securing of the lens, without any risks of loosening.

There are no provisions for the use of glues, screws and corresponding parts, and the drawbacks caused by such components employed in prior art eyeglasses are avoided.

Other advantageous aspects of the present eyewear are described in the other claims.

The present invention further relates to a method for the construction of an eyewear or at least of a part thereof and to a hinge for the rotation of the arm of the eyewear.

The present invention further relates to a system or means for connecting the arm, the bridge or the hinge to the front part, preferably directly to lens means, of the eyewear.

DESCRIPTION OF THE DRAWINGS

The invention, in its technical features and in its different advantageous aspects, shall become more readily apparent from the detailed description that follows, made with reference to the accompanying drawings, which show embodiments provided purely by way of non limiting examples, in which:

FIG. 3A shows a perspective view relating to the first preferred embodiment of the present invention, showing a detail of the hinge and of the attachment of the arm to the respective lens, with the illustration of the lens in longitudinal section, taken according to the line III—III of FIG. 1;

FIG. 3B shows a perspective view of the components of the hinge of FIG. 3A which are shown individually in exploded, unassembled condition;

FIG. 3C shows a longitudinal section view taken according to the line IV—IV of FIG. 1 of a detail of the bridge area;

FIGS. 4 through 14 show the phases of mounting the present embodiment of eyewear in accordance with a first preferred embodiment;

FIG. 24 shows a perspective view of an enlarged detail of a third embodiment of the hinge for articulating the arm relative to the lens (shown in section view) in the condition with the arm closed;

FIG. 24B shows a perspective view of the components of the hinge of FIG. 24, which are shown individually in an exploded, unassembled condition;

FIG. 25 shows a perspective view of an enlarged detail of the third embodiment of the hinge for articulating the arm relative to the lens (shown in section view) in the condition with the arm open;

DESCRIPTION OF PREFERRED EMBODIMENTS OF THE PRESENT INVENTION

In accordance with FIGS. 1 through 3A of the accompanying drawings, a first preferred embodiment 10 of eyewear, according to the present invention, comprises a first and a second lens 12, 12, and a support frame for said lenses.

Figure 1:
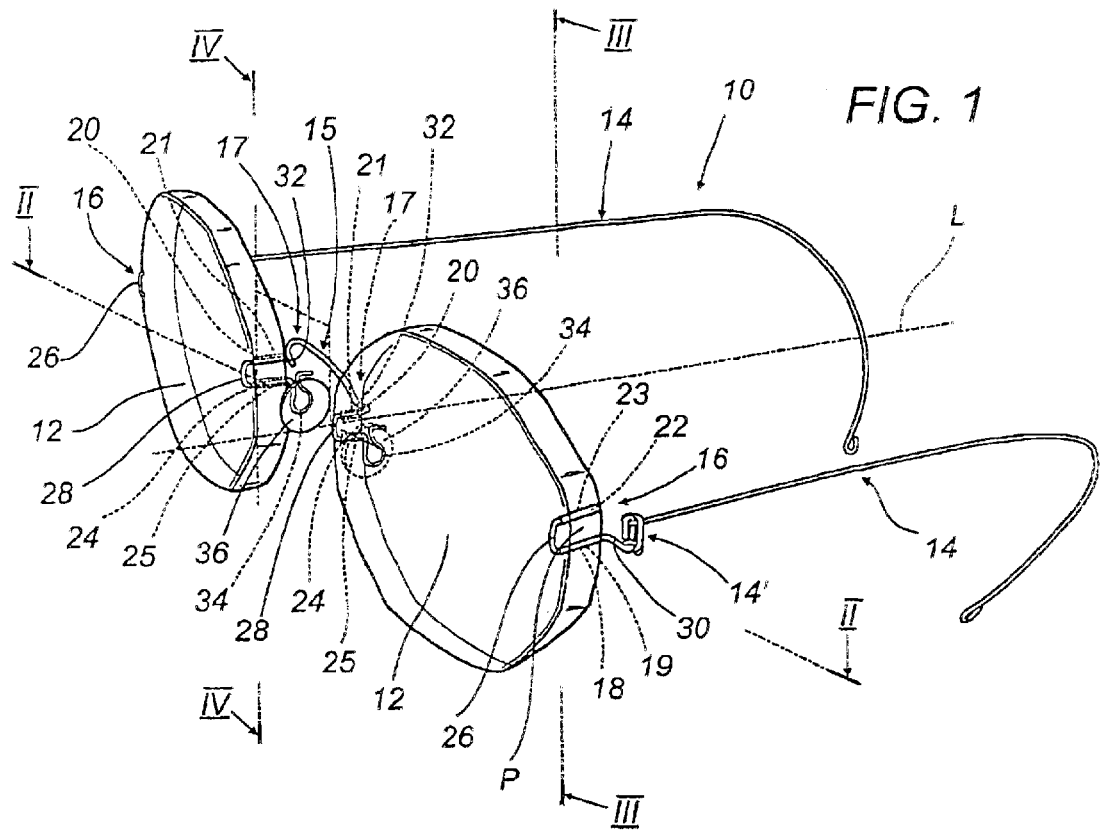
FIG. 1 shows a perspective view of a first preferred embodiment of an eyewear according to the present invention.
Figure 2:
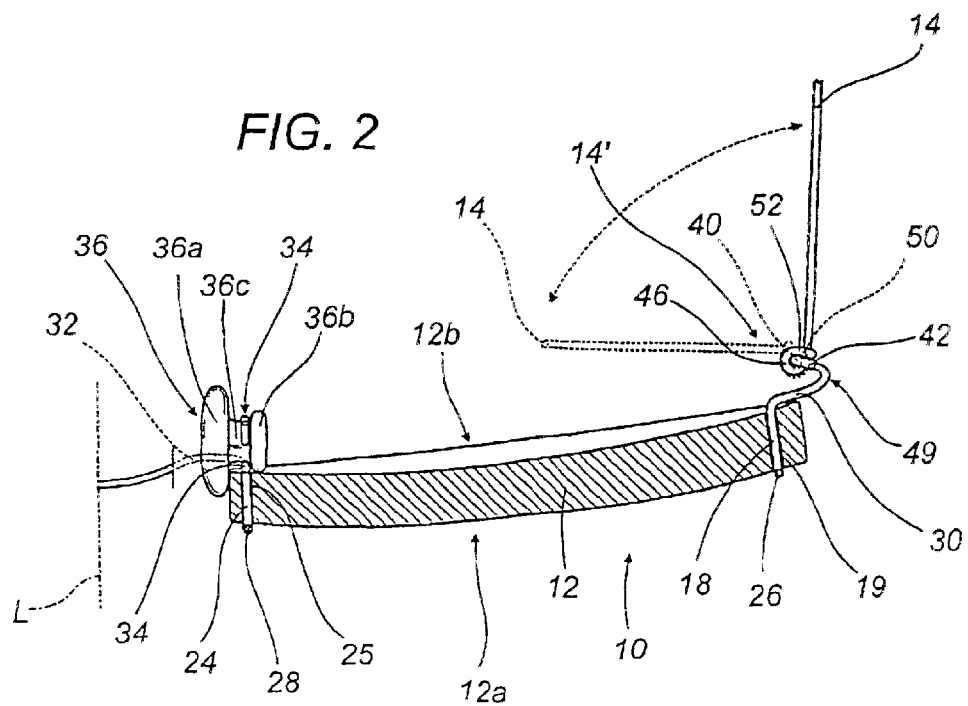
FIG. 2 shows a horizontal section view, taken according to the line II—II of FIG. 1, of the first preferred embodiment of eyewear according to the present invention.

The reference L in FIGS. 1 and 2 indicates a longitudinal reference axis, parallel to the normal line of sight exiting from the eyes of a user of the eyewear.

In accordance with this first preferred embodiment, the frame comprises a first and a second lateral arm 14, 14, which are connected by means of a corresponding hinge 14', to the respective lens 12, 12, and a bridge element 15 for intermediate connection between said lenses 12, 12.

As shown in particular in FIGS. 1 and 3A, each lateral arm 14 is connected to the corresponding lens 12 by means of a respective attachment portion 16, made of metal wire, which has a first longitudinal part 18 for insertion into a first through hole 19, provided in the respective lens 12, and a second longitudinal part 22, which is inserted into a second through hole provided in the respective lens 12 and indicated with the numerical reference 23.

In turn, said bridge element 15 is connected to the corresponding lenses 12, 12 by means of respective first and second lateral attachment portions 17, 17, made of metal wire, both of which have a first longitudinal portion 20 for insertion into a corresponding first through hole 21, provided in the respective lens 12, and a second longitudinal part 24 which is inserted into a second through hole 25 provided in the respective lens 12, 12.

Said longitudinal insertion portion provide for retaining the lenses in the transverse direction.

Advantageously, said portions 16, 16 for attaching the arms 14, 14, to the respective lenses 12, 12 comprise, each, a respective first transverse portion 26 of said metal wire, which extends bent perpendicularly from said first longitudinal portion 18, downstream of said hole 21 for the insertion thereof, and which is positioned substantially parallel to the corresponding front face of the lens 12, 12.

Moreover, as shown, from said transverse portion 26 extends the aforementioned second longitudinal insertion portion 22, which extends bent into the second through hole 23 provided in the respective lens 12.

As FIG. 2 clearly shows, said first longitudinal portion 18 for insertion upstream of the corresponding hole 19 is provided on the extension of a portion 30, which is bent back transversely and which bears against the lens 12 on the opposite side from the one whereon extends said first transverse portion 26 providing, therewith, for securely retaining the corresponding lens 12 in the longitudinal direction.

Moreover, in similar fashion, said portions 17, 17 for attaching the bridge 15 to the corresponding lens 12, 12, comprise, each, a respective first transverse portion 28 of said metal wire, which extends bent from said first longitudinal portion 20, downstream of said hole 21 for the insertion thereof, which is positioned substantially parallel to the corresponding face of the lens 12, 12, and wherefrom said second longitudinal insertion portion 24 extends bent into the second through hole 25 provided in the respective lens 12, 12.

In this way, the metal wire provides a sort of "stitch" which allows to retain the corresponding lens firmly and securely.

Moreover, as said FIG. 2 clearly shows, said first longitudinal insertion portion 20, upstream of the corresponding hole 21, extends from a transversely bent portion 32 which bears against the lens 12, 12 on the opposite side from that of said first transverse portion 28, providing, therewith, for securely retaining the corresponding lens 12, 12 in the longitudinal direction.

As said FIG. 2 clearly shows, the retaining portion 30, bent transversely, extends laterally beyond the peripheral profile or lateral edge P of the lens 12, 12. As regards instead the transversely bent portion 32, for attaching said bridge 15 to the corresponding lens 12, said portion extends laterally, towards the other lens 12, beyond the peripheral profile of the lens 12, 12, and defines said connecting bridge 15.

As the aforementioned FIGS. 1 and 2 show, each portion 17 for fastening the bridge 15 to the corresponding lens 12, 12, further comprises a vertically bent portion 34 for supporting a nose piece 36 for bearing on the user's nose, which is bent vertically downward and is able to define means for retaining the lens 12 in the longitudinal direction which engage a corresponding area of the inner face 12b of the corresponding lens.

Said vertically bent portion 34 for supporting a nose support organ, or nose piece, 36 is generally shaped as a "U", with upwardly converging branches, in such a way as to provide a seat for receiving the nose piece 36.

As FIGS. 2 and 3C clearly show, the nose piece 36, made of rubber or the like, is composed of a main discoidal element 36a for bearing on the nose, of a secondary discoidal portion 36b with lesser diameter than the main portion 36a, and of an intermediate portion 36c for the mutual adhesion between said two discoidal elements 36a, 36b. Said intermediate portion 36c connects said discoidal elements 36a, 36b, in correspondence with their central area. As shown, said intermediate adhesion portion 36c is inserted in the retaining seat provided by said "U" shaped portion 34.

As shown in particular in FIGS. 2 and 3C, said first transverse portions 26, 28 and said second transversely bent portion 30, 32 are respectively positioned in correspondence with the front face 12a and with the rear face 12b of the corresponding lens 12, 12.

Moreover, the parts 18, 20, 22, 24 for insertion into a corresponding hole 19, 21, 23, 25 of the lens 12, 12 extend mutually parallel, whilst said holes 19, 21, 23, 25 for receiving the aforementioned insertion portions extend substantially perpendicular to the outer and inner surfaces of the lens 12a, 12b. According to the present first preferred embodiment, said transverse intermediate portions 26, 28, of said metal wire, extend substantially according to the vertical direction, with reference to an eyewear in conditions of use.

Moreover, the diameter of the bole 19, 21, 23, 25 may be suitably greater than the diameter of the insertion portion 18, 20, 22, 24, to facilitate mounting operations. In particular, the holes 19, 23, for inserting the first longitudinal portion 18, 20, may also have a greater diameter than that of the holes 21, 25 for receiving the second longitudinal portion 20, 24, in order to facilitate sliding even more during mounting operations.

According to a preferred embodiment, the metal wire may be obtained with a diameter of 0.7 mm, whilst of said insertion holes provided in the respective lens, the larger one for first insertion may have a diameter of 0.8 mm, and the other hole may have a diameter of 0.75 mm.

In regard to the means for attaching the arm to the lens, it is further observed that, advantageously, said first longitudinal insertion portion 18 extends in a hole 19 positioned below the hole 23 for said second longitudinal insertion portion 22, whilst, in regard to the means for attaching the bridge to the respective lens, it is observed that, advantageously, the first longitudinal insertion portion 20 extends in a hole 21 positioned above the hole 25 for the second longitudinal insertion portion 24.

According to a further advantageous aspect, each hinge 14' for the rotation of the arm 14 comprises a portion, of said portion 16 for attachment to the corresponding lens 12, which extends vertically in such a way as to define an articulation pivot 40 for an end hinging portion of the arm 14. The hinging end of said arm 14 comprises a first portion shaped as a coil 46 on the extension of the longitudinal body of the arm 14, which is held in the vertical direction by the second backward-bent portion 42 at the upper end of the pivot 40, and a second portion shaped as a coil 48, which is held in the vertical direction by the second backward-bent portion 44, at the lower end of the pivot 40.

As FIG. 2 clearly shows, said backward-bent portion 48 is joined by means of a portion 49, substantially "U" shaped and extending according to a substantially horizontal plane, to said transverse portion 30.

Said first and second coil portions 46, 48 are wound about the pivot portion 40 and are mutually connected through a vertical connecting portion 50 defining, with said backward-bent portions 42, 44 of the pivot portion 40, means for arresting the opening rotation of the corresponding arm 14.

As FIGS. 3A and 3B show, said first and second coil portions 46, 48 comprise a segment 46', 48' which is positioned inside or between the upper and lower horizontal portions 52 and 54, at the ends of said connecting portion 50. Said horizontal portions 52, 54 join said connecting portion 50 to a corresponding coil portion 46, 48.

With further advantage, the second coil portion 48, wound about the vertical pivot 40, has a terminal segment 48" that extends downstream of said segment 48' situated internally or above the lower horizontal portion 54 of the loop 48 and which is bent vertically downward, in such a way as to define a gripping hook for the corresponding horizontal portion 54.

The present support frame has arms that are essentially in the form of an elongated body composed by a single metal wire. Hence, the arm is definitely flexible. A metal wire is used whose diameter ranges between 0.7 and 0.9 mm, and is preferably equal to 0.7 mm.

In this way, an arm is obtained which has considerable flexural elasticity. This characteristic allows to obtain an arm that, during its positioning on the user's face and its removal therefrom—when the eyewear is gripped on at least an arm—is able to be deformed to a considerable extent, in a flexural manner, without transmitting excessive stresses to the lens. The lenses do not risk breakage and can be fabricated with very small thickness, for instance ranging between 1 mm and 3.5 mm. One thereby obtains a very light eyewear that inconvenience the user to a very limited extent only.

According to another aspect, the current portions for attachment to the lenses allow firmly to grip said lenses, thereby considerably distributing the stresses that are transmitted to the lenses. No excessive stress peaks, comparable to those imparted to the corresponding lenses by the connection systems employed in prior art eyeglasses, are produced. It is therefore possible to reduce the diameter of the holes and/or the thickness of the lenses relative to the stresses produced according to the prior art.

A metal wire can be used, to obtain the means of attachment or connection to the lenses, which has an advantageously small diameter, relative to those used in eyeglasses according to the prior art.

The rotation hinge of the arm is obtained with a limited quantity of wire and is therefore definitely light to the advantage of the overall weight of the eyewear. Moreover, the present hinge has a considerable degree of strength.

According to a first preferred method for assembling the present pair of eyeglasses, the mounting process provides for starting from the bridge element 15 for intermediate connection between the lenses. As FIG. 4 shows, one starts from an elongated metal wire 15" whose length is appropriately predefined, which is inserted, as shown in FIG. 5, in the upper hole 21, whose diameter is sufficiently greater than the diameter of the metal wire, in order to allow an easy and rapid insertion of the main portion 15a of said wire into the hole 21.

Thereupon, a bending operation is executed, with substantially right angles or similar, to obtain said first transverse portion 28, and which provides a segment 15b, bent backwards, which is substantially parallel to the main portion 15a of the metal wire 15". The wire 15" could also, alternatively, be bent beforehand, avoiding said bending operation.

As FIG. 6 shows, according to the present invention, the secondary segment 15b is then inserted in the lower hole 25 and, with further thrust, one obtains the simultaneous passage into the respective holes 21 and 25 of the secondary portion 15b and of the remaining portion of the main portion 15a.

At this point, one bends downwards the secondary portion 15b, which defines the vertical portion 34 and which is bent into a "U" shape, thereby obtaining said support seat for the nose piece 36.

As FIG. 7 shows, said main portion 15a is then inserted into the hole 21 of the other lens 12, which also has a diameter sufficiently greater than the diameter of the metal wire for the purpose of allowing its easy and rapid insertion and, as FIG. 8 shows, a bending operation with substantially right angles is executed in order to obtain the corresponding intermediate portion 28, wherefrom extends an additional bent-back segment 15c, which is substantially parallel to the main portion 15a of the metal wire 15".

Figure 9:
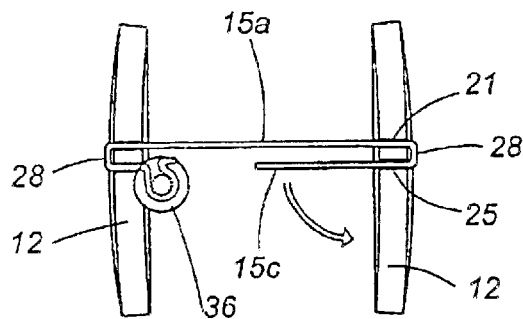

As shown in FIG. 9, the secondary segment 15c is then inserted into the lower hole 25 and, with further thrust, one obtains the simultaneous passage into the respective holes 21 and 25 of the secondary portion 15b and of the remaining part of the main portion 15a.

Figure 10:
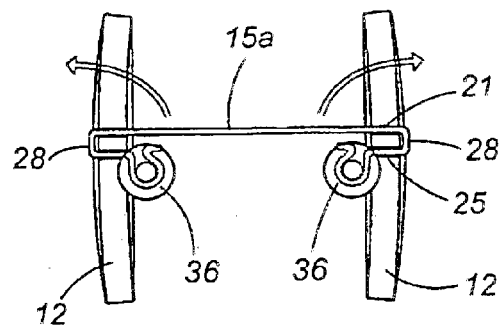

At this point, as FIG. 10 shows, one bends downwards the secondary portion 15c, which is bent into a "U" shape to obtain a corresponding support seat for the other nose piece 36.

Figure 11:
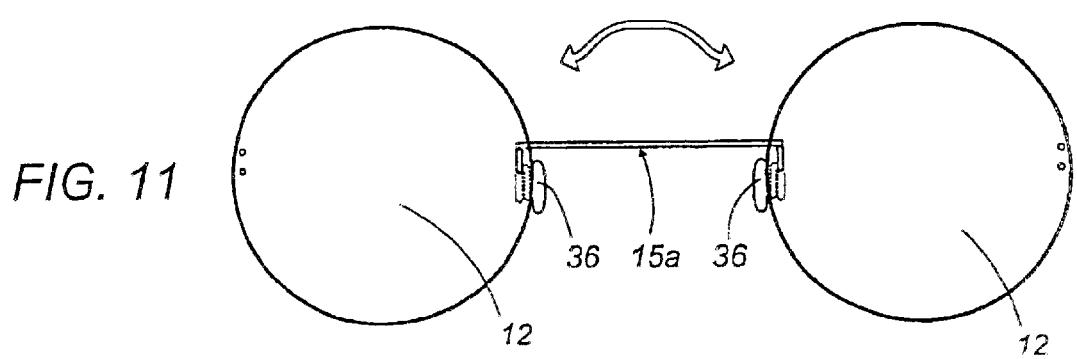
Figure 12:
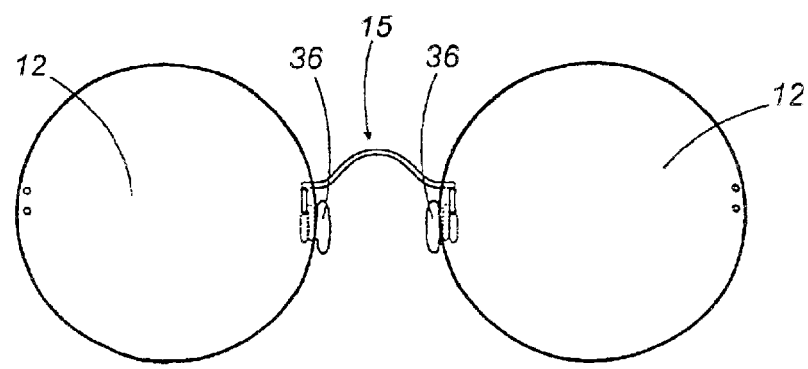

The lenses 12, 12 are then rotated substantially by 90°, in such a way as to position them in the coplanar position of FIG. 11, corresponding to the utilisation condition shown in FIG. 1. The portion 15 is then deformed, in such a way as to obtain a bridge having an appropriately arched profile, having its concavity oriented upwards, as shown in FIG. 12.

Figure 13:
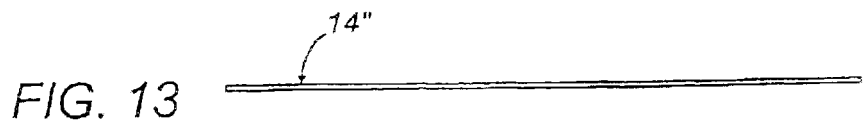
Figure 14:
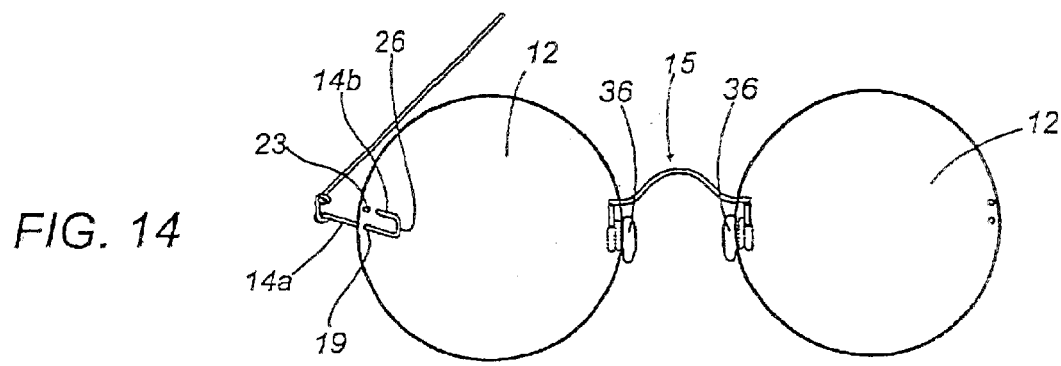

At this point, the portion 16 for the attachment of a first arm 14 can be constructed. As FIG. 13 shows, one starts from an elongated metal wire 14" having appropriately predefined length, which is inserted, as shown in FIG. 14, in the lower temple hole 19, whose diameter is sufficiently greater than the diameter of the metal wire in order to allow an easy and rapid insertion of the main portion 14a of said metal wire 14" into the hole 19. Thereupon, a folding operation is executed with substantially right angles to obtain said intermediate portion 26, wherefrom extends a back-bent segment 14b, which is substantially parallel to the main portion 14a of the metal wire 14". The wire 14" could, alternatively and advantageously, be bent beforehand.

As shown in FIG. 14, the secondary segment 14b is then inserted into the upper temple hole 23, and, with further thrust, one obtains the further passage into the respective holes 19 and 23 of the secondary portion 14b and of the corresponding part of the main portion 14a. The backward bending of the metal wire 14" is executed in such a way that the length of the secondary portion 14b is no greater than the thickness of the lens, so as not to project outwardly therefrom.

After the completion of the insertion operation, the portion 14a is bent outwards, in order to obtain the transverse portion 30 for retaining the lens 12. Thereupon, the free end of said portion 14a is bent, in such a way as to obtain the pivot portion for the hinging of the arm, as described above.

Otherwise, operating in an alternative manner, it is possible to start from a metal wire whose pivot portion has already been obtained and whereto the arm has already been connected. In this case, the free end of the metal wire is inserted into the lower hole 19, the metal wire portion which passed beyond said hole 19 is bent, in order to obtain the back-bent portion 22—which is then inserted into the corresponding hole 23—and the first transverse portion 26. One then thrusts, in the opposite direction from the previous one, to insert said longitudinal portion 22 into said hole 23, and lastly the wire is bent laterally upstream of the hole 19, to define the transverse portion 30 for longitudinally retaining the lens. This alternative procedure is not shown in the accompanying drawings. The attachment of the other arm 14 is obtained in similar fashion.

Figure 15:
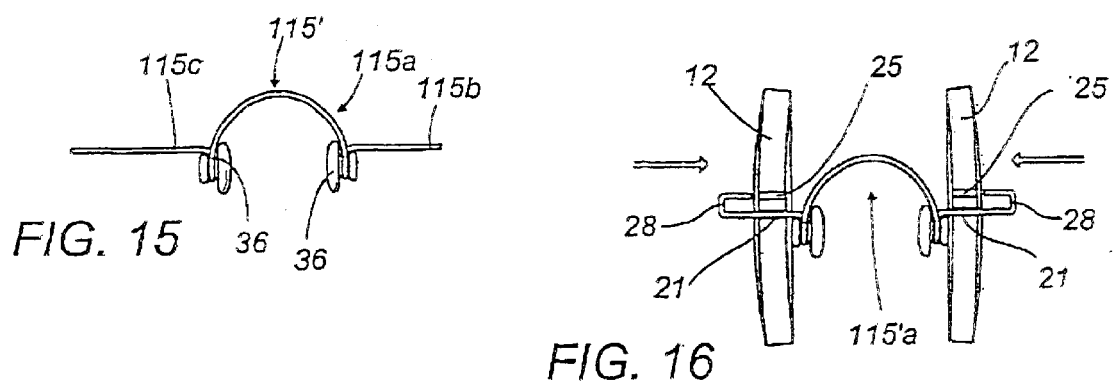
FIGS. 15 through 18 show the various mounting phases of the intermediate bridge for connection between the lenses in accordance with a second preferred embodiment.

As the subsequent FIGS. 15 through 18 show, the connecting bridge between the lenses 12, 12 could be mounted in an alternative manner relative to the preferred manner indicated above. One starts in this case from a substantially pre-formed bridge 115', which, as FIG. 15 shows, comprises a main portion 115a, which is already provided with an arched shape and bears the nose pieces 36, wherefrom a first and a second rectilinear lateral portions 115b and 115c extend laterally.

Said first and second rectilinear lateral portions 115b and 115c are inserted into the lower holes 21, 21 of the respective lenses 12, 12, and, then, bent in such a way as to define corresponding intermediate portions 28, 28.

Figure 17:
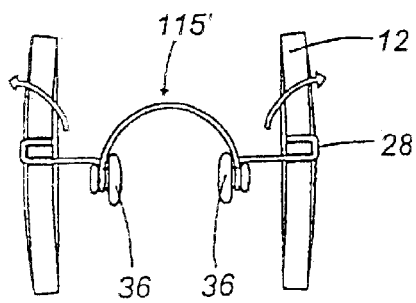

The free, back-bent end of said lateral portions is then inserted in the corresponding upper hole 25, 25 of the respective lens 12, 12, as shown in FIG. 17.

Figure 16:
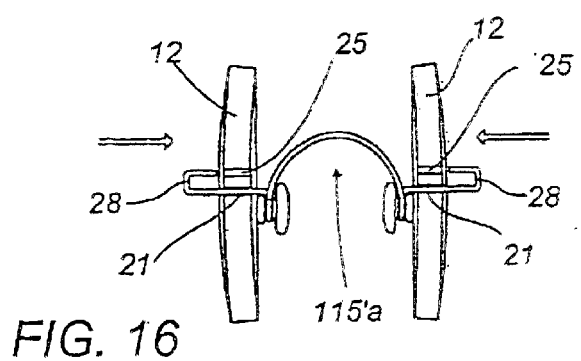
Figure 18:
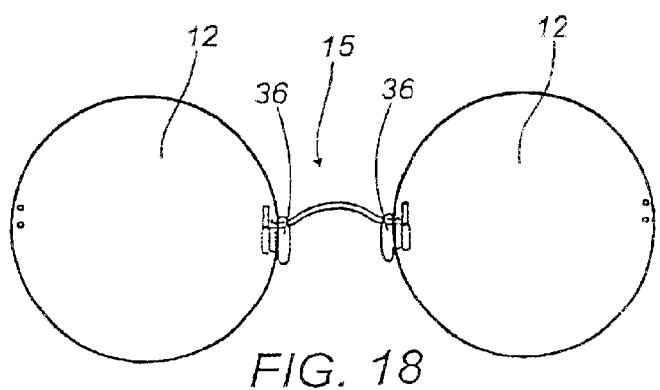

At this point, the lenses 12, 12 are rotated substantially by 90°, in such a way as to bring them from the mutually parallel position, shown in FIGS. 16 and 17, to the substantially coplanar position of FIG. 18, corresponding to the utilisation condition shown in FIG. 1, in which the lenses lie substantially on a plane perpendicular to the longitudinal axis L.

The mounting of the bridge on the lenses is thereby extremely simplified.

The small thickness of the metal wire further facilitates the formation and precision of execution of the bends.

The metallic material of the frame wire, which is elastically flexible and able to be plastically deformed in order to impart the necessary preparatory bends, is preferably selected from the following materials: titanium and harmonic steel, to the advantage of the weight and elasticity of the frame.

A second preferred embodiment 100 of an eyewear is shown in the subsequent FIGS. 19 through 22. This second eyewear is constituted by lens means, in particular comprising a first and a second lens 112, 112 having an inner surface 112' destined to the oriented, in used, towards the wearer's face and an opposite outer face 112".

As shown, said lenses 112, 112 have a circular profile. Although the circular conformation is particularly preferred, to obtain determined advantageous effects in accordance with the present second embodiment it is in any case sufficient, as shall become more readily apparent hereafter, for the lens means 112, 112 to be provided with a respective peripheral edge 113 which has at least a portion of its profile having an arched or inclined conformation. The individual lens could therefore have a polygonal outer profile.

The numerical references 112a and 112b indicate, in the accompanying figures, respectively, an external lateral area of the lens, destined to the attachment of the corresponding arm 114 to the respective lens 112, and an internal lateral area of the lens, which is destined to the attachment of the bridge 115 for fastening between the lenses, as shall become more readily apparent hereafter.

To facilitate the description, the reference M indicates a median plane that passes through the median points of the lenses (indicated with the reference in the figure) and that is oriented substantially horizontal, when the eyewear is in the worm condition. This horizontal orientation of said plane M corresponding to a condition of the eyewear as normally worm, for instance on a standard test head or by a user who looks forward normally.

The eyewear 100 also has a suitable supporting frame for said lens means 112, 112, which comprises a first and a second lateral arms 114, 114, and an intermediate fastening bridge 115 between said lenses 112, 112.

As shown, means are provided for fastening the respective arm 114, 114 to said lens means 112, 112 and means for fastening said bridge 115 to the respective lens 112, 112.

The fastening means of the arm and of the bridge comprise respective first and second longitudinal portions 118, 122 or 120, 124 for introduction into corresponding hole means provided in said lens means 112, 112, in particular for insertion into corresponding first and second hole 119, 123 or 121, 125 in said lens means 112, 112.

According to the present embodiment, moreover, a perpendicular connection portion 126 or 128 is advantageously provided, which has an end for its junction to said first longitudinal portion 118, 120 and an opposite end for its junction to said second longitudinal portion 122, 124.

As shown, according to the present preferred embodiment, said perpendicular connection portion 126, 128 is able to extend in correspondence with the outer or front surface 112" of said lens means 112, 112.

According to the present preferred embodiment, this perpendicular fastening portion 126, 128 defines means for retaining in the longitudinal direction acting, advantageously, on the front or upstream side 112" of said lens means 112, 112.

Figure 21B:
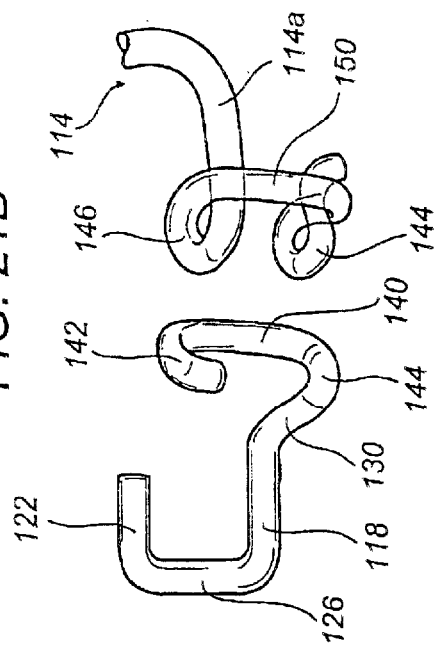
FIG. 21B shows a perspective view of the components of the hinge of FIG. 21, which are shown individually in an exploded, unassembled condition.
Figure 21:
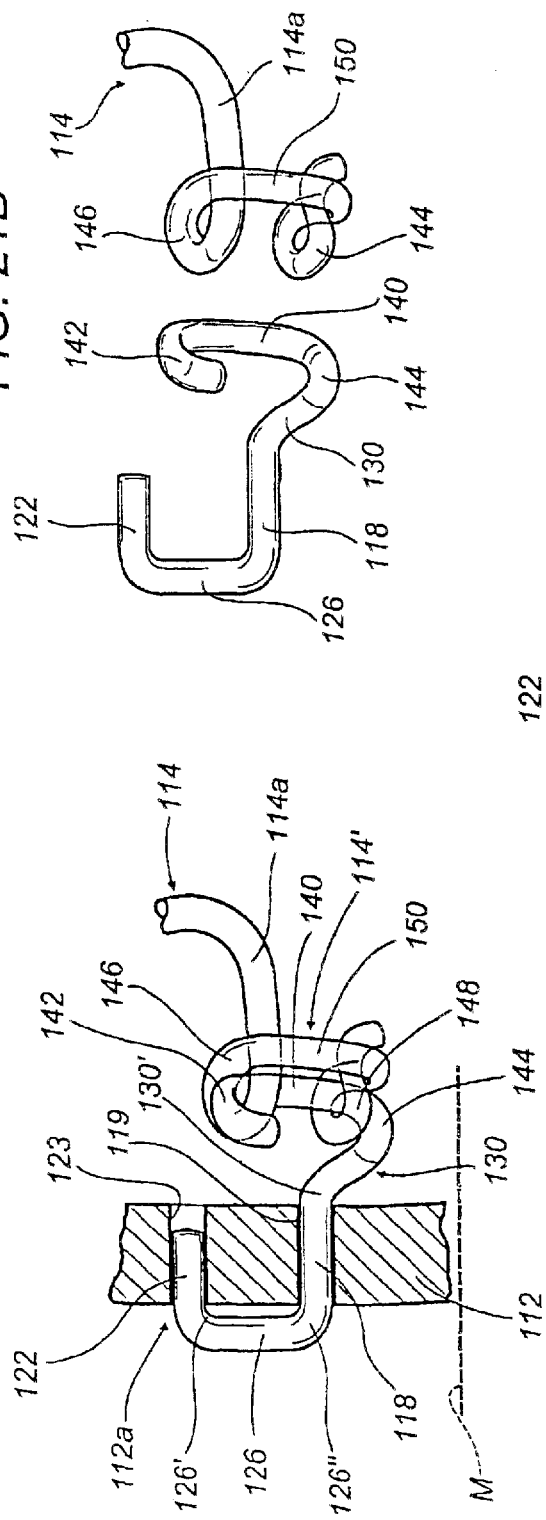
FIGS. 21 and 22 show a perspective view, similar to that of FIG. 3A, of an enlarged detail of the second preferred embodiment, relating to the attachment of the frame, in correspondence with the arm, to the respective lens (taken in section according to the line XXI—XXI of FIG. 19A), respectively in the condition with the arm closed and with the arm open.

As FIG. 21 clearly shows, in particular, said means for retaining in the longitudinal direction on the front or outer side of said lens means 112, 112, are defined, in this second preferred embodiment, by the extreme arched segments 126', 126", which join said perpendicular portion 126 to said first and second longitudinal portions 118, 122.

Figure 23:
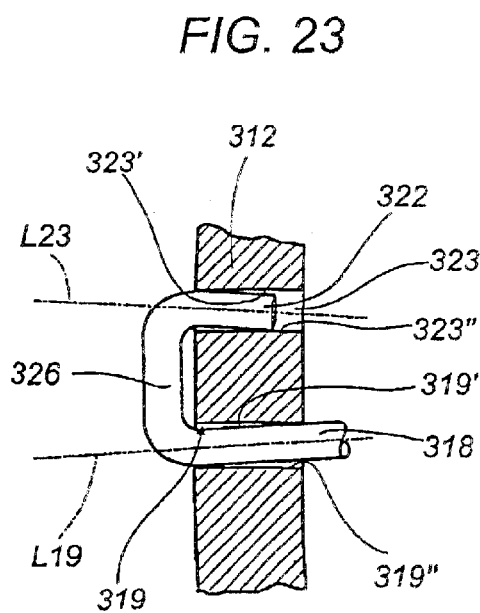
FIG. 23 shows a longitudinal section view of an enlarged detail of an additional preferred embodiment of the means for fastening the frame to the respective lens.

Advantageously, as shown in particular in the subsequent FIG. 23, showing a further embodiment of said means for fastening the elements of the frame to the corresponding lens, said longitudinal fastening portions 318, 322 can extend, in a corresponding hole 319, 323 of the lens 312, in such a way as to be positioned inclined relative to the hole and thereby be able to exert an elastic engagement action against the opposite walls 319', 319", 323', 323" of the respective hole 319, 323, thereby providing a suitable retaining action on the corresponding lens 312.

In particular, as said FIG. 23 shows, said longitudinal portions 318, 322, which are joined by a corresponding perpendicular connection portion 326, are located in the respective holes 319 and 323 in such a way as to be oriented according to respective extension directions L19, L23, not parallel to each other and converging towards the rear part of the lens. Although the present embodiment is preferred and advantageous, one could nonetheless image positioning said longitudinal portions inclined in said holes in a converging manner towards the front part of the lens.

In accordance with a further aspect, not shown in the accompanying figures, one could also image providing, in the lenses, holes for the insertion of a respective pair of longitudinal attachment pivots that are not mutually parallel. In this way one obtains a configuration that allows to prevent, to the greatest extent, the extraction of the pivots from the holes of the lenses.

Figures 19A, 19B:
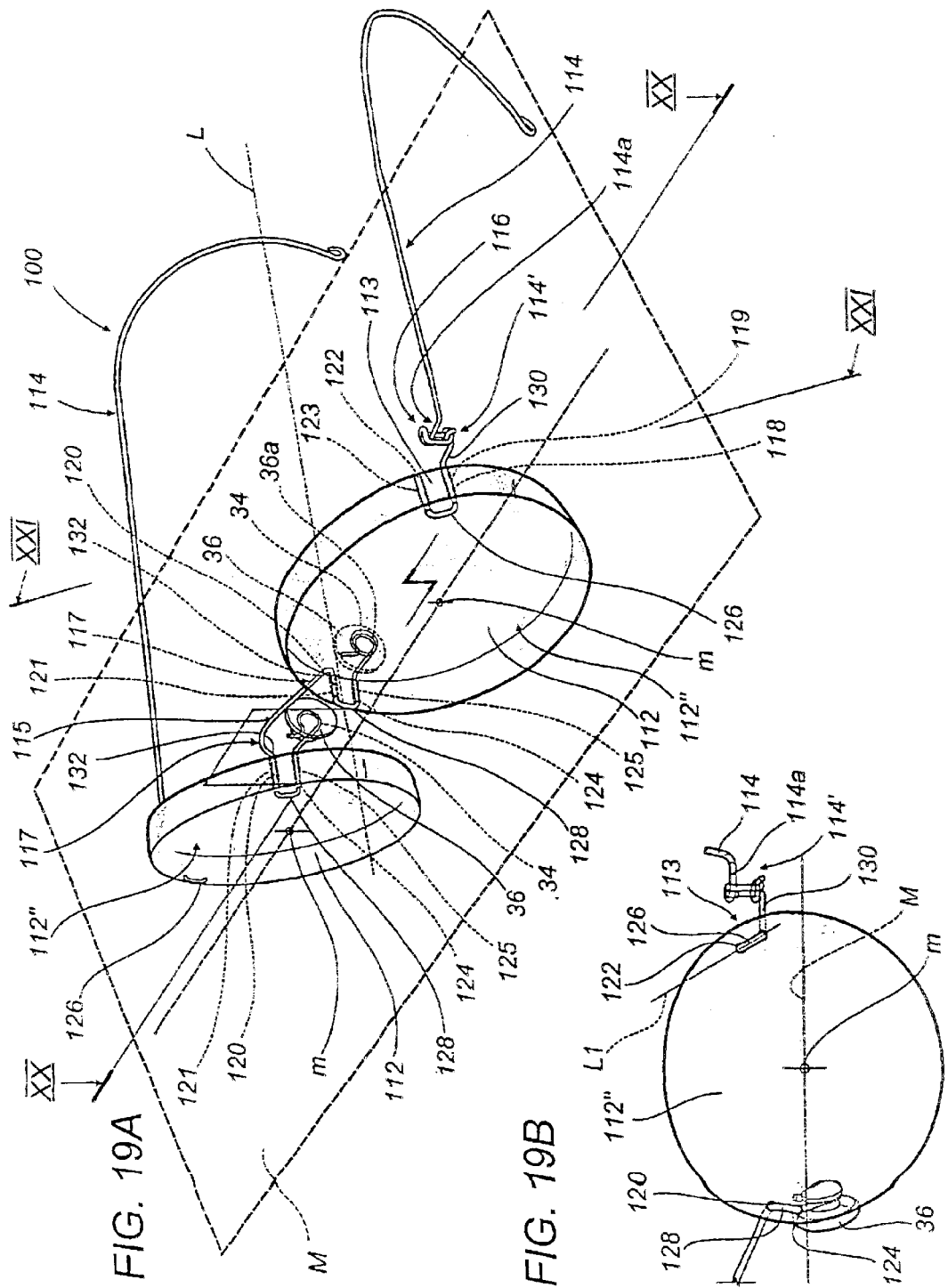
FIG. 19A shows a perspective view of a second preferred embodiment of an eyewear according to the present invention.
FIG. 19B shows a partial front view of the second preferred embodiment of eyewear according to the present invention.

As FIG. 19B clearly shows, said longitudinal portions 118, 122 are positioned substantially equidistant from the peripheral edge 113, of the respective lens means 112, 112. The attachment area thereby remains confined in the vicinity of the edge of the lens and one avoids excessively encumbering the lens in correspondence with said attachment point. A greater field of view is obtained for the user.

In practice, as shown in particular in FIG. 19B, the transverse portions of said first and second portions 118, 122 are positioned aligned according to a line L1, which extends substantially parallel to the peripheral edge 113 of the respective lens means 112, 112. One thus obtains that also the perpendicular fastening portion 126 between said pivots 118, 122 is inclined in such a way as to extend substantially parallel to the peripheral edge 113 of the respective lens means.

In accordance with the second preferred embodiment shown herein, it is correspondingly provided for said first and second hole 119, 123, for the insertion of the respective longitudinal portions 118, 122, to be positioned substantially equidistant from the peripheral edge 113 of the respective lens means 112, 112. Therefore, according to the present preferred embodiment said first and second hole 119, 123 for insertion of the respective longitudinal portions 118, 122 have the corresponding circular sections, which are transverse to the longitudinal axes of said holes, whose centres are connected by an imaginary line that extends substantially parallel to the peripheral edge of the respective lens means 112, 112.

Although the previous embodiment is particularly advantageous and preferred, one could also image introducing said longitudinal pivots substantially equidistant from the corresponding area of the peripheral profile, while remaining inside hole means having a different configuration from the one shown, for instance hole means constituted by a single oblong introduction hole for both said pivots. Said oblong hole extending parallel to the edge of the profile of the lens.

Advantageously, according to the present preferred embodiment, said fastening means are connected to the respective lens in a point or zone, which is particularly close to the edge of the lens and which is located above the horizontal medium plane M which passes through the centre of gravity of the lens. In this case, the fastening means are located in a particularly peripheral position and hinder the user's view only to a minimal extent.

In this second embodiment as well, the respective perpendicular portion 126, 128, downstream of said lens means 112, extends bent back from said first longitudinal portion 118, 120, whilst said second longitudinal portion 122, 124 extends bent back from said downstream perpendicular portion 126, 128 in the second hole 123, 125 provided in said lens means 112, 112.

As shown, also the second embodiment of the eyewear is provided with fastening means comprising a respective transverse portion 130, 132 that extends from said first longitudinal portion 118, 120 on the interior or rear side 112' of said lens means 112, 112.

Said transverse upstream portion 130, 132 defines advantageous retaining means in the longitudinal direction on the rear or upstream side of said lens means 112, 112. Said retaining means in the longitudinal direction on the upstream or interior side to the lens means 112, 112 are defined, according to the present second preferred embodiment, by a respective arched junction segment, 130' or 132', of said upstream transverse portion, with said first longitudinal portion 118, 120.

As shown, each first longitudinal portion 118, 120 of the respective fastening means extends folded substantially perpendicular from said transverse portion 130, 132.

Figure 20:
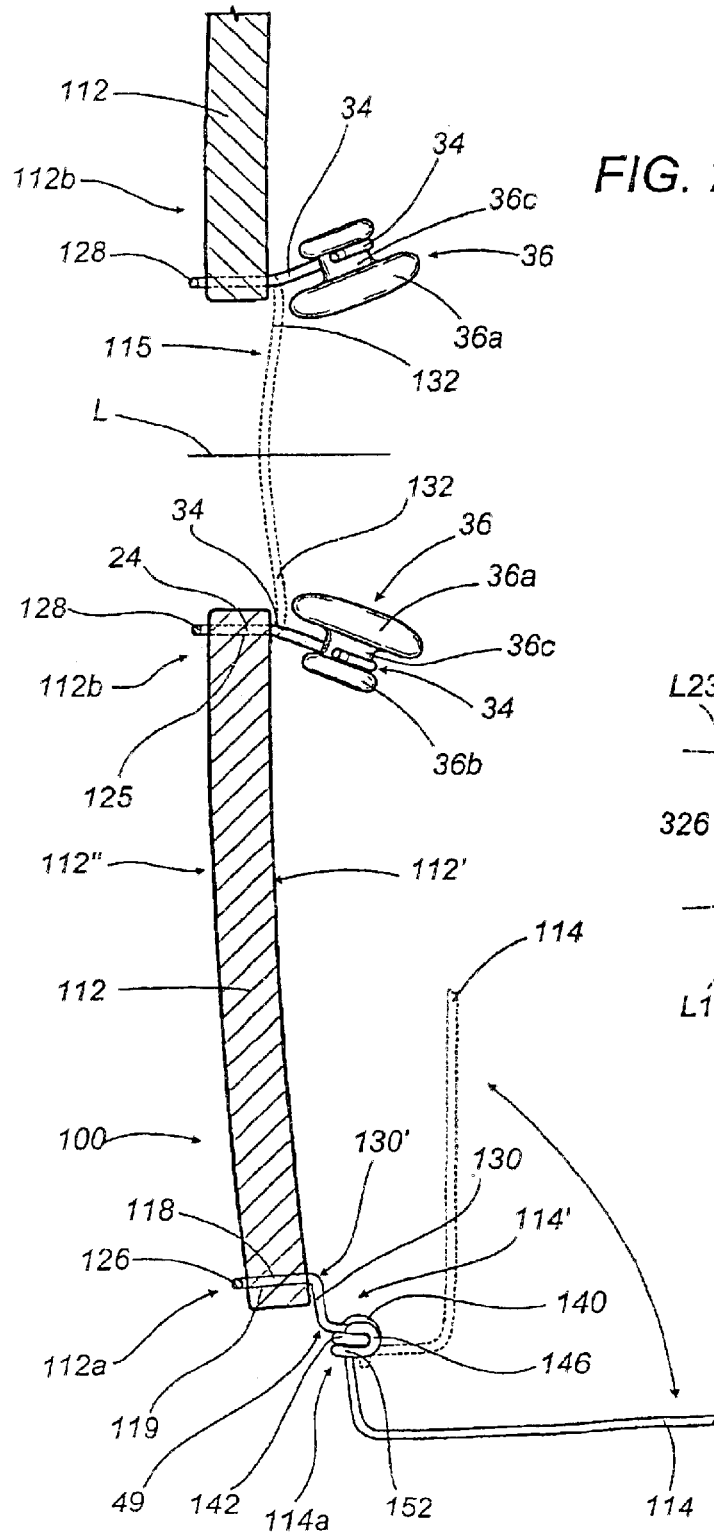
FIG. 20 shows a section view, taken according to the line XX—XX of FIG. 19A, of the second preferred embodiment of eyewear according to the present invention.

Also in this second preferred embodiment of eyewear, hinge means 114' are provided between each arm 114, 114 and the respective means for fastening to the lens means 112, 112, which hinge means allow the rotation of the arm 114, 114, in a plane parallel to the plane M, between a closed position (shown in dashed line in FIG. 20) and an open position (shown in full line in FIG. 20).

As shown, said hinge means 114' are obtained in correspondence with the end of said transverse portion 130, which is opposite to the end for attachment to said lens means 112.

As the aforementioned FIGS. 19B and 20 clearly show, in accordance with this second preferred embodiment the movable arm 114 has an end for fastening to the hinge 114', which is provided with a transverse end extension 114a.

Said bent-back end portion 114a extends towards the portion defining the hinge 114' and allows to position the respective arm in an appropriate transverse position, without the need excessively to extend in width the lenses or the means 130 for supporting the hinges, which extend from the respective lenses. Moreover, an eyewear having a pleasing conformation from the aesthetic point of view is thereby obtained.

As shown, said transverse extension 114a extends, from said hinge means 114', starting from a vertically distanced point, relative to the point of attachment to said hinge means 114', from said transverse portion 130.

Figure 22:
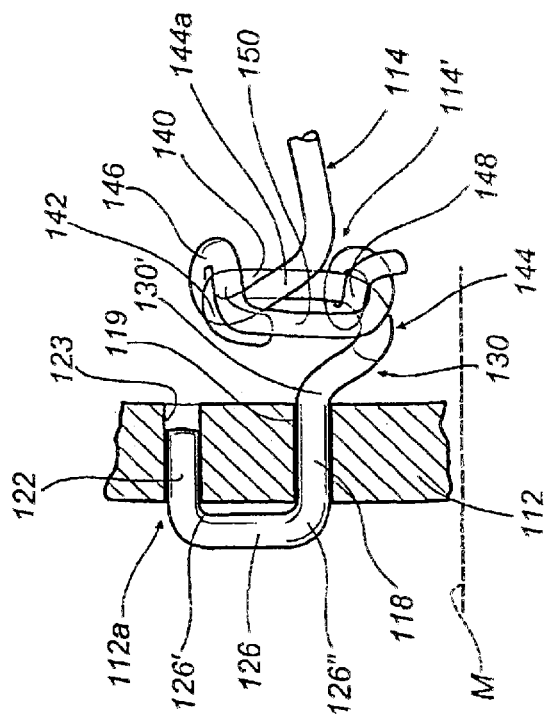

As can be observed also with reference to FIGS. 21, 21B and 22, the hinge means 114' thus comprise receiving means defining a seat for an articulation pivot, which comprise only a first and a second annular or coil portions 146, 148, vertically distanced from each other.

As shown in the respective figures, in this second preferred embodiment the insertion means comprise a corresponding vertical pivot portion 140 that is inserted into said annular portions 146, 148.

In particular in accordance with the present second embodiment, said pivot means 140, extend vertically by said fixed means 130 for connecting to the lens, while said annular portions 146, 148 are provided at the end of the respective arm 114 and are connected to each other through a connecting vertical portion 150.

In particular, in accordance with the present second preferred embodiment, the pivot means 140, which extend from said means 130 fixed to the lens, are connected to said transverse portion 130 through a junction portion 144, which extends longitudinally or substantially at a right angle relative to said transverse portion 130. In this way, the construction of this particular hinge is simplified.

In this second preferred embodiment, in order to provide a retaining action in the vertical direction, said annular portion 146, 148 are positioned between a first upper longitudinal portion 142 and a lower longitudinal portion 144, defining said portion providing junction to said fixed means 130.

In this second preferred embodiment the bridge 115 is substantially similar to the bridge of the first preferred embodiment and therefore it is not necessary to describe it again in detail. The bridge of this second preferred embodiment differs from the bridge of the first preferred embodiment only in that, in this second preferred embodiment, the downward-bent portion, to define means for supporting the respective nose piece, does not engage, as was instead the case in the first preferred embodiment, the interior or upstream portion of the respective lens.

Obviously, this second preferred embodiment of eyewear is obtained with a metal wire that has, in a preferred and advantageous manner, the characteristics of the wire of the first preferred embodiment illustrated above.

The subsequent FIGS. 24, 24B and 25 show a third and advantageous embodiment of hinge 214'. In said FIGS. 24, 24B and 25 the means for attachment to the lens 212 comprise longitudinal fastening portions 218, 222 which extend, in a corresponding hole 219, 223 of the lens 212, which are joined by a corresponding perpendicular connecting portion 226, located forward of the front surface of the lens 212, in a manner wholly similar to the first preferred embodiment illustrated previously.

In accordance to this third and advantageous embodiment of hinge 214' shown in FIGS. 24, 24B and 25, said first annular portion 246 and said second annular portion 248 are integral, respectively, with the lateral arm 214 and with said means for fastening to the lens means.

In particular, as shown in said FIGS. 24, 24B and 25, said upper annular portion 246 extends from the end transverse portion 214a of the arm, whilst said lower annular portion 248 extends from the transverse portion 230, which extends from the means for attachment to the respective lens 212.

Although the present embodiment is a particularly preferred one, the ring 246, which extends from the arm 214, could also be positioned in the lower position and the ring 248, which extends from the means for fastening to the lens, could also be positioned in the upper position.

As shown, said annular portions 246, 248 advantageously receive pivot or insertion portions 240b, 240a, which extend from the other element to be connected.

In practice, the means fixed to the lens 212 comprise, in addition to the annular portion 248, a short pivot portion 240b which is inserted in the annular portion 246, that is integral with the arm 214, whilst said arm 214 has a short pivot portion 240a, which is inserted in the annular portion 248 of said means 230 integral with the lens 212.

The present third embodiment of hinge is particularly easy to construct and mount. The execution of a single annular portion on a respective element to be joined allows to execute a number of minimal bends or curves on the individual element, allowing to operate in an easier manner on the metal wire to be bent. Overall, therefore, a greater working speed is obtained for the construction of the components of the present articulation hinge. Moreover, the mounting of the present hinge can be performed more rapidly; it is sufficient to insert, simultaneously, the individual pivots in the annular portions of the other element of the articulated connection, conveniently exploiting the flexibility of the metal wire material whereof the parts of the present hinge are made.

As shown, said annular portion 246 and said pivot portion 240a of said arm 214 are connected by means of a respective connecting portion, which comprises a substantially vertical portion 250a extending from the respective annular portion 246 and an oblique portion 251a for junction to said pivot portion 240a. In similar fashion, said annular portion 248 and said pivot portion 240b integral with said means 230 for fastening to the lens 212 are connected by means of a respective connecting portion, which comprises a substantially vertical portion 250b extending from the respective annular portion 248 and an oblique portion 251b providing junction to said pivot portion 240b.

Means are provided for arresting the rotation of said arm in the open position, corresponding to the condition of use of the eyewear, in which the respective arm extends in the longitudinal direction. For this purposes, said connecting portion between the annular element 246 and the pivot portion 240a of the arm and said connecting portion between the annular element 248 and the pivot portion 240b of the means 230 fixed to the lens 212 are made in such a way as to intersect and interfere with each other defining said means for arresting the angular rotation of the arm 214.

Moreover, in this third embodiment of hinge it is advantageously provided for said oblique portions 251a, 251b, providing junction to the respective pivot portion 240a, 240b of the arm 214 and of the fixed means for fastening to the lens 212, to engage the interior and opposite surfaces of the annular portions 246, 248 of the other element defining retaining means in the vertical direction. Moreover, a hook portion 252 extends from the end pivot portion 240b of the arm 214 and goes to envelop the annular element 248 fixed to the lens providing respective retaining means in the vertical direction. Said hook means 252 being able to slide during the opening and closing of the respective arm on the exterior surface of the annular element 248.

This third preferred embodiment of hinge is preferably obtained with a metal wire having the characteristics of the metal wire illustrated with reference to the first and the second preferred embodiment of eyewear indicated above.

Figure 26B:
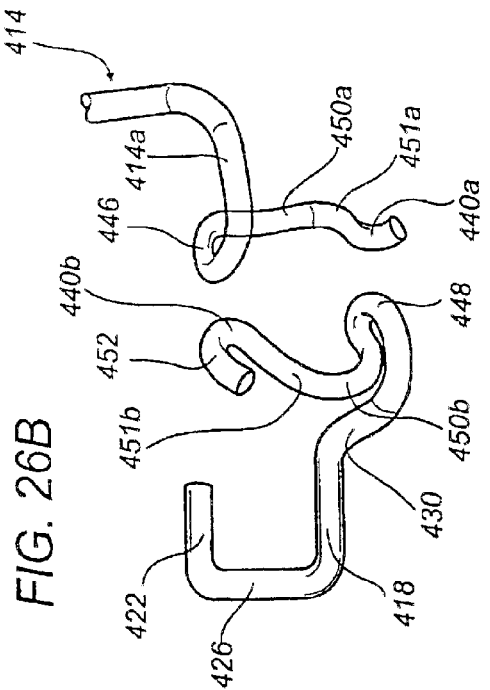
FIG. 26B shows a perspective view of the components of the hinge of FIG. 26 which are shown individually in an exploded, unassembled condition.
Figure 26:
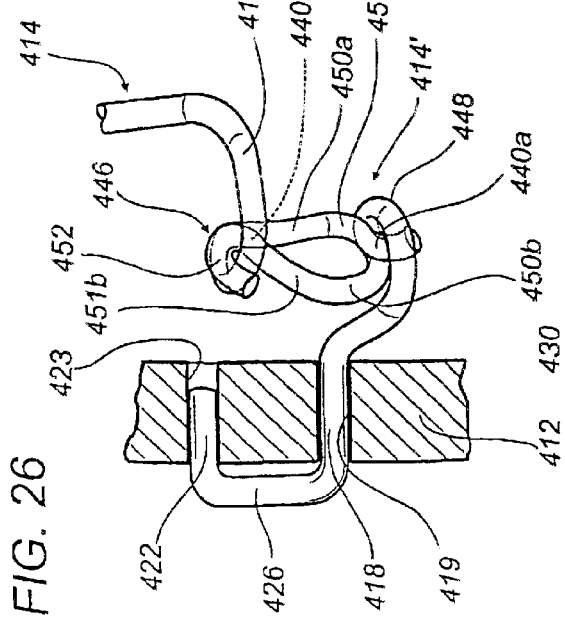
FIG. 26 shows a perspective view of an enlarged detail of a fourth embodiment of the hinge for articulating the arm relative to the lens (shown in section view) in the condition with the arm closed.
Figure 27:
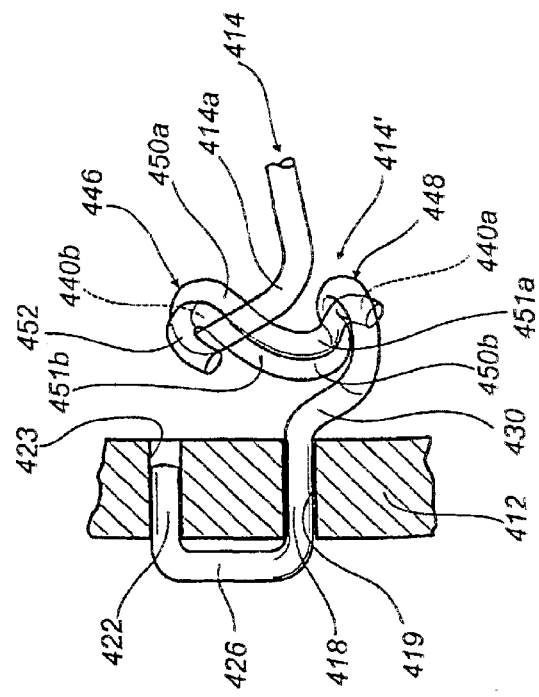
FIG. 27 shows a perspective view of an enlarged detail of the fourth embodiment of the hinge for articulating the arm relative to the lens (shown in section view) in the condition with the arm open.

In the subsequent FIGS. 26, 26B and 27, a fourth embodiment of hinge 414' for articulating the arm 414 to the respective lens means is shown. In said FIGS. 26, 26B and 27, the means for attachment to the lens 414 comprise longitudinal fastening portions 418, 422, which extend, in a corresponding hole 419, 423 of the lens 412, which are joined by a corresponding perpendicular connection portion 426 located forward of the front surface of the lens 414, in wholly similar fashion to the previous preferred embodiments illustrated above.

In particular, as shown in FIG. 26, which refers to a condition where the arm is closed, substantially parallel to said lens means, said fourth embodiment of hinge comprises a first annular or coil portion 446, which is obtained on the extension of the arm 414 and a second annular portion or coil 448, which is obtained on the extension of the means for fastening to the lens 412 and extends from the transverse portion 430 in wholly similar fashion to the previous embodiments.

Differently from the third embodiment of hinge, the upper ring 446, which extends from the transverse end portion 414a of the arm, is obtained from a curved segment which, once the ring 446 has been constructed, extends downwards without being superposed to said portion 414a or initial segment of the annular element 446.

In similar fashion, the lower annular element 448 is obtained from a curved portion, which extends from the transverse portion 430 and which, after defining said annular element, extends upwards without passing underneath said transverse portion 430 or initial segment of the annular element 448.

In practice, said annular portions 446, 448 are obtained by means of a bent-back portion, which is curved until reaching in substantial correspondence with the portion, wherefrom it extends, and subsequently bent upwards, to define corresponding extension portions towards the opposite ring 448 and 446.

In this fourth embodiment as well, said annular portions 446, 448 receive by insertion, respectively, the pivot portions 440b and 440a which extend from the other element to be connected.

In essence, in this fourth embodiment as well, the means fixed to the lens 412 have, downstream of said annular element 448, an end pivot portion 440b, which is inserted internally to the annular portion 446 of the annular element, that is integral with the arm 414. In turn, the arm 414 has, in addition to the annular element 446, an end pivot portion 440a, which provided downstream of said annular element 446 and which is inserted in the annular element 448, i.e. in the inner hole provided by said annular portion 448. In this way an easily obtained articulation connection is defined, suitable for allowing a rotation of the arm relative to the lens in a substantially horizontal plane.

Between the annular element 446 and the corresponding pivot portion 440a for the insertion of the arm 414, a first oblique portion 450a, extending from said annular element 446, and a second oblique portion 451a extending from said portion 450a are provided, to define, with its end part, said pivot portion 440a and which is bent back in such a way as to define a corner portion with said first oblique portion 450a.

In a similar manner between the annular portion 448 and the pivot portion 440b of the means fixed to the lens 412, there are a first oblique portion 450b, which extends from the annular element 448, and a second oblique portion 451b, which extends from said first oblique portion 450b and defines, with its end portion, said pivot element 451b and which also defines, with said first oblique portion 450b, a corner or "U" shaped configuration.

Retaining means in the vertical direction are defined by said second oblique portions 451a and 451b, which engage the upper and, respectively, lower surface of the ring 448 and of the ring 446.

In practice, said oblique portions cooperate with the portions of said ring that are oriented vertically towards the inner part of said connection, i.e. towards the other annular element.

A hook element 452 extends from the end of the pivot element 440b and winds, on the exterior side, the annular element 446 of the arm 414, relative whereto it is able to slide during the opening and closing phases, i.e. during the rotation of the arm relative to the corresponding lens means.

A secure retaining action in the vertical direction is thereby obtained.

In order to arrest the rotation of the arm in the open arm position, suitable to guarantee the placement of the eyewear on the user's head, said inclined or oblique portions 450a, 450b of the arm come in contact or engage the oblique portions 450b and 451b of the means fixed to the lens, as shown in FIG. 27.

In practice, said oblique portions 450b and 451b of the means fixed to the lens are positioned substantially according to a vertical and longitudinal plane and said oblique means 450a and 451a, which extend from said portion 414a, that is oriented substantially perpendicular or with an angle greater than 90° relative to the main body of the arm 414, engage said oblique portions 450b and 451b, when, after being rotated according to a substantially horizontal plane, they are also positioned according to a vertical and longitudinal plane.

As show, in this fourth embodiment of articulation hinge 414' said annular portions 446, 448 are defined by an arched portion, which develops substantially on a plane of lay and from one of whose end extends, in substantially perpendicular or inclined direction, a respective junction portion 450a, 450b, without any superposition of parts of said annular o and/or junction portions.

In practice, in this fourth embodiment of hinge, since the vertically directed portions, which extend from the respective rings 446, 448, do not wind at all about said rings, before extending in the opposite direction, they are particularly quick and easy to obtain.

Moreover, since the means for arresting the rotation of said arm are defined substantially by the entire retaining surface of the opposite first and second oblique portion, a uniform distribution of the stresses on the different parts of the present hinge is obtained, with lesser risk of causing breakage or disassembly due to localised overstresses.

With the present embodiment of eyewear, there is no need to use adhesive material or glues of any kind. Also avoided is the use of caps, screws or rivets, provided in prior art embodiments, structurally simplifying the fastening system and facilitating mounting operations.

Moreover, the present fastening allows to distribute the retaining stresses, that the attachment of the frame imparts to the lens, on a larger surface around the hole, relative to the prior art, enabling to minimise the stresses that the fastening exerts on the lenses.

Preferably and advantageously, in the preferred embodiments illustrated above, the arms, the intermediate bridges between the lenses, said portions of the frame for attachment to the lens means, the hinge for the rotation of the arms, are made of a metal wire, which has a diameter ranging between 0.7 mm and 0.9 mm, is preferably equal to 0.7 mm, and is preferably made of titanium or harmonic steel.

The invention thus conceived can be subject to numerous modifications and variations, without thereby departing from the scope of the inventive concept. Moreover, all components can be replaced with technically equivalent elements. In particular, the system or means for connecting the arm, bridge or hinge to the lens means of the eyewear, may be coupled with any other portion or front part of the eyewear.

What is claimed is:

1. Eyewear comprising:

lens means;

a supporting frame for said lens means, said support frame comprising a first and a second lateral arm and means for fastening the respective arm to said lens means, said fastening means comprising a first and a second longitudinal portions, of approximately equal outside diameter, inserted into corresponding hole means provided in said lens means;

a perpendicular connecting portion which has respective ends for joining to said first and said second longitudinal fastening portion; and first and second holes, of approximately equal diameter and having an interior diameter corresponding to the outside diameter, in each of a lens of said lens means, wherein, said first and second longitudinal fastening portions are inserted in a corresponding one of the first and second holes of each lens in said lens means.

2. Eyewear as claimed in claim 1, wherein said longitudinal fastening portions extend inclined in the corresponding hole of the corresponding lens.

3. Eyewear as claimed in claim 1, wherein said longitudinal fastening portions are, in the respective holes, oriented according to respective directions of extension that are not mutually parallel.

4. Eyewear as claimed in claim 1, wherein said fastening means comprise holes for receiving the insertion portions of the fastening means which are not mutually parallel.

5. Eyewear as claimed in claim 1, wherein said longitudinal fastening portions are positioned substantially equidistant from the peripheral edge of the respective lens means.

6. Eyewear as claimed in claim 1, wherein said perpendicular portion for connection between said longitudinal portions is inclined in to extend substantially parallel to the corresponding segment of the peripheral edge of the respective lens means, which is adjacent to said connecting portion.

7. Eyewear as claimed in claim 1, wherein said perpendicular fastening portion defines means for retaining said lens means in the longitudinal direction.

8. Eyewear as claimed in claim 7, wherein said means for retaining said lens means in the longitudinal direction comprise the arched end segments which join said perpendicular portion with said first and second longitudinal portions.

9. Eyewear as claimed in claim 1, further comprising a transverse portion that extends from said first longitudinal portion for connection to said lens means.

10. Eyewear as claimed in claim 9, wherein said transverse portion defines means for retaining said lens means in the longitudinal direction.

11. Eyewear as claimed in claim 10, wherein said means for retaining in the longitudinal direction are defined by an arched segment joining said upstream transverse portion to said first longitudinal portion.

12. Eyewear as claimed in claim 9, wherein said transverse portion extends laterally beyond the lateral peripheral profile of said lens means.

13. Eyewear as claimed in claim 1, wherein said movable arm has, in correspondence with the end connecting to the front part of the eyewear, a transverse extension.

14. Eyewear as claimed in claim 1, wherein, said first and a second lateral arms are each connected to respective ones of said first longitudinal portions, and said second longitudinal portions have an unconnected free terminal end opposite the end joined to the perpendicular connecting portion.

15. Eyewear as claimed in claim 1, wherein the diameter of the receiving hole is greater than the diameter of the corresponding longitudinal insertion portion.

16. Eyewear as claimed in claim 1, wherein said attachment means of the arm have a hole, for said first longitudinal insertion portion, which is positioned below the hole, for said second longitudinal insertion portion.

17. Eyewear as claimed in claim 1, wherein said means for attaching the bridge have a hole, for said first longitudinal insertion portion, which is positioned above the hole, for the second longitudinal insertion portion.

18. Eyewear as claimed in claim 1, wherein said first and second longitudinal fastening portions are constituted by a single bent metallic wire.

19. Eyewear as claimed in claim 1, wherein the arm is in the form of an elongated body composed by a single metallic wire.

20. Eyewear as claimed in claim 1, wherein the metal wire has a diameter ranging between 0.7 mm and 0.9 mm.

21. Eyewear as claimed in claim 20, wherein the metallic wire has a diameter of 0.7 mm.

22. Eyewear as claimed in claim 1, further comprising hook means that envelop a corresponding annular portion.

23. Eyewear as claimed in claim 22, wherein the second coil portion enveloping the vertical pivot has a vertical segment bent downwards, which extends downstream of said segment located internally or above the lower horizontal portion of said connecting portion, in such a way as to define a gripping hook for the corresponding horizontal portion of said connecting portion.

24. Hinge for articulating the arm of the eyewear, wherein it is obtained according to claim 1.

25. Means for connecting the arm, the bridge or the hinge to a front part of the eyewear, to corresponding lens means, wherein they are obtained according to claim 1.

26. Eyewear comprising a first and a second lens and a frame for supporting said lenses, in which said support frame comprises a bridge for intermediate fastening between said lenses and means for fastening said bridge to the respective lens, said fastening means comprising a first and a second longitudinal portions of equal diameter for introduction into corresponding hole means provided in the corresponding lens; wherein said fastening means comprise a perpendicular connecting portion with respective ends for joining to said first and second longitudinal fastening portions; and said first and second longitudinal fastening portions are inserted in corresponding equal-diameter first and second circular holes in the corresponding lens.

27. Eyewear as claimed in claim 26, wherein said portion for fastening the bridge to the corresponding lens comprises a portion bent vertically downwards able to define means for retaining the lens in the longitudinal direction.

28. Eyewear as claimed in claim 27, wherein said vertically bent portion extends downwards and is so shaped as to provide a seat for receiving a nose piece for bearing on the nose.

29. Eyewear comprising:

two lenses each with first and second equal-diameter circular holes;

a frame, with first and second lateral arms, supporting the two lenses;

fasteners connecting each of the lateral arms to a respective one of the first and second lenses, the fasteners comprising two equal-diameter longitudinal portions inserted into corresponding ones of the first and second holes;

hinge means are provided between each arm and the respective fastener, said hinge means comprise receiving means and insertion means for insertion into said receiving means which receiving means and insertion means are able to rotate relative to each other, said receiving means comprising a first annular portion and a second annular portion vertically distances from each other, and said insertion means comprises a corresponding pivot portion inserted in said first and second annular portions.

30. Eyewear as claimed in claim 29, wherein said pivot means extend vertically from said fixed means for fastening to the lens and said annular portions are obtained at the end of the respective arm and are mutually connected through a connecting portion extending perpendicularly.

31. Eyewear as claimed in claim 29 wherein said first annular portion and said second annular portion are respectively provided integral with the lateral arm and with said means for fastening to the lens means said annular portions receiving pivot portions of the other element to be connected.

32. Eyewear as claimed in claim 31, wherein said means integral with the lens comprise a short pivot portion that is inserted in an annular portion integral with the arm and said arm has a short pivot portion that is inserted in an annular portion integral with said means for fastening to said lens means.

33. Eyewear as claimed in claim 32, wherein said annular portions and said pivot portions of the arm and of the means fixed to the lens are joined by means of a respective connecting portion.

34. Eyewear as claimed in claim 33, wherein at least part of said connecting portion, between the annular element and the pivot portion of the arm, and at least part of said connecting portion, between the annular element and the pivot portion of the means fixed to the lens, are made in such a way as to interfere with each other defining means for arresting the angular rotation of the.

35. Eyewear as claimed in claim 33, wherein said oblique portions providing junction to the respective pivot portion, of the arm and of the fixed means for fastening to the lens, engage the interior and opposite surfaces of the annular portions of the other element defining means for retaining in the vertical direction.

36. Eyewear as claimed in claim 29, wherein said pivot means, which extend from said fixed means, are connected to said transverse portion by means of a junction portion that extends longitudinally, or substantially at right angle, relative to said transverse portion.

37. Eyewear as claimed in claim 29, wherein the hinge for fastening the arm comprises a pivot portion of said portion for attaching to the corresponding lens, which pivot portion extends vertically and has at its ends a first and a second portions bent backwards; said hinge further comprises a portion for hinging the arm to said pivot portion, which comprises a first coil shaped portion, on the extension of the body of the arm, which is held vertically from said first backward-bent portion at the end of the pivot, and a second coil shaped portion, which is held vertically by the second backward-bent portion, provided in correspondence with the other end of the pivot.

38. Eyewear as claimed in claim 37, wherein said first and second coil portions are mutually connected by means of a vertical fastening portion defining, with said backward-bent portions of the pivot portion, means for arresting the rotation for opening the corresponding arm.

39. Eyewear as claimed in claim 37, wherein said first and second coil portions comprise a first and a second segment that is positioned between a first and a second horizontal portion, at the opposite ends of said connecting portion.

40. Eyewear as claimed in claim 29, wherein said annular portions are defined by an arched portion developing substantially on a plane of lay and from one of whose ends a respective junction portion extends in substantially perpendicular or inclined direction, without any superposition of parts of said annular and/or junction portions.

41. Method for obtaining an eyewear comprising a first and a second lens and a supporting frame for said lenses in which said support frame comprises a first and a second lateral arm connected by means of a corresponding hinge to the respective lens, and a bridge element for intermediate fastening between said lenses wherein, in order to obtain the portion for attaching the bridge to the respective lenses, starting from an elongated metal wire, the method comprises the steps of:

inserting said elongated metal wire into a first, upper one of two holes within one of the lenses;

executing a bending operation to obtain a first transverse portion that is positioned substantially parallel to the front face of the corresponding one lens and wherefrom a back-bent segment extends, providing such a thrust as to cause the back-bent segment to be inserted into a second, lower one of the two holes in such a way as to result in a first longitudinal portion of the metal wire extending through the upper hole, and a second longitudinal portion inserted through the second, lower hole, the first and the second holes being of equal diameter.

42. A method as claimed in claim 41, further comprising rotating the lenses substantially by 90° in order to position the lenses substantially coplanar to each other, in a corresponding utilization condition, thereby defining transversely bent portions, and wherein, after insertion through the second, lower hole, said second longitudinal portion is bent downwards to obtain a support seat for a corresponding nose piece.

43. A method as claimed in claim 41, wherein, to obtain the portion for attaching an arm to the corresponding lens, it provides, starting from an elongated metal wire in which a pivot portion for the articulation of the arm has been pre-formed and whereto the arm is connected, inserting the free end of the metal wire into the lower hole of the lens, bending the portion of metal wire that has passed beyond said hole in such a way as to obtain the back-bent portion and the first transverse portion, thrusting to insert said longitudinal portion into the corresponding hole provided in the lens and bending laterally the wire upstream of the hole to define the portion for longitudinally retaining the lens.

44. A method as claimed in claim 41, wherein to obtain the attachment portion of an arm to the corresponding lens and/or to obtain the portion for the attachment of the bridge to the respective lenses, a pre-bent elongated metal wire is provided.

45. A method for obtaining an eyewear comprising a first and a second lens, a supporting frame comprising a first and a second lateral arm connected by a corresponding hinge to the respective lenses, and a bridge element intermediately fastening between said lenses, to obtain a portion connected the lateral arms to corresponding ones of the lenses, the method comprising:

inserting an elongated metallic wire into a first, temple hole provided in the lens;

executing a bending operation to obtain an intermediate portion positioned substantially parallel to the front face of the corresponding lens and wherefrom extends a back-bent segment;

providing such a thrust as to cause the the back-bent segment into a second hole provided in the lens, in order to define a first longitudinal portion of the metal wire inserted through the first hole, and a second longitudinal portion inserted into the second hole, the first and second holes having the same diameter, a main portion of the wire extending out from a rear face of the lens.

46. A method as claimed in claim 45, the method further provides for bending the main portion of the wire, extending out the rear face of the lens, outwardly in order to obtain a transverse bent-back portion, and wherein, the free end of the main portion is bent in such a way as to obtain a pivot portion for hinging the arm, said pivot portion extends vertically and is bent backwards in correspondence with the end, in such a way as to have a first and a second back-bent portions, between which are held a first coil-shaped portion, on the extension of the body of the arm, and a second coil-shaped portion integral with said first coil-shaped portion and vertically distanced therefrom; said coil shaped portions being wound about said vertical pivot portion.

47. A method as claimed in claim 46, wherein a terminal segment of said second coil-shaped portion for winding the vertical pivot is bent downwards in such a way as to define a gripping hook for the corresponding horizontal portion of a connection portion (50) between said coil-shaped portions.

48. A method for obtaining eyewear comprising a first and a second lens and a supporting frame for said lenses in which said support frame comprises a first and a second lateral arm connected by means of a corresponding hinge to the respective, and a bridge element for intermediate connection between said lenses, to obtain the portion for the attachment of the bridge to the respective lenses, the method comprises:

starting from a substantially pre-formed bridge which comprises a main portion wherefrom a first and a second rectilinear lateral portions extend laterally, inserting said first and second rectilinear lateral portions into the lower holes of the respective lenses;

bending backwards said rectilinear lateral portions, in such a way as to define corresponding intermediate portions lying in correspondence with the front face of the corresponding lens; and inserting said back-bent portions into the corresponding upper hole of the respective lens, the lower and upper holes having the same diameter.

49. The method of claim 48, comprising the further step of rotating said lenses substantially by 90° in order to position the lenses substantially coplanar to each other.

* * * * *